United States Patent [19]

Rohn

[11] 4,385,022
[45] May 24, 1983

[54] PROCESS FOR PREPARING BIAXIALLY ORIENTED FILMS OF BUTENE-1 HOMOPOLYMER AND COPOLYMERS

[75] Inventor: Charles L. Rohn, Bridgewater, N.J.

[73] Assignee: Mobil Oil Corporation, New York, N.Y.

[21] Appl. No.: 264,895

[22] Filed: May 18, 1981

[51] Int. Cl.$^3$ ............................................... D01D 5/12
[52] U.S. Cl. .................................. 264/210.1; 264/28; 264/289.3; 264/290.2; 264/346; 526/348.1; 526/348.6
[58] Field of Search .................... 264/28, 210.1, 210.3, 264/289.3, 290.2, 346; 526/348.1, 348.6

[56] References Cited

U.S. PATENT DOCUMENTS

| | | | |
|---|---|---|---|
| 3,078,504 | 2/1963 | Koppenhele | 264/289 |
| 3,091,807 | 6/1963 | Turner et al. | 264/210.1 |
| 3,226,459 | 12/1965 | Tijunelis | 264/28 |
| 3,450,805 | 6/1969 | Chesser | 264/28 |
| 3,468,862 | 9/1969 | Schotland | 264/28 |
| 3,558,580 | 1/1971 | Orser | 526/348.1 |
| 4,138,458 | 2/1979 | Skilling | 264/210.3 |

OTHER PUBLICATIONS

R. Stein and B. Rhodes, Journal of Applied Physics, 31, 1873 (1960).

Primary Examiner—Donald E. Czaja
Assistant Examiner—W. Thompson
Attorney, Agent, or Firm—Charles A. Huggett; Michael G. Gilman; Edward J. Trojnar

[57] ABSTRACT

A process for making a film of butene-1 homopolymer and copolymers of improved strength and clarity and the film made thereby. Such a film is produced by quenching an extruded poly(butene-1) homopolymer or copolymer while in the amorphous state, preferably at temperatures below 0° C., and biaxially stretching the quenched film before substantial crystallization occurs. Subsequent heat setting of the film at a temperature above the stretching temperature, but below its melting point, produces a heat stable film of high break strength and clarity, suitable as a food wrap or food container overwrapping material.

5 Claims, No Drawings

PROCESS FOR PREPARING BIAXIALLY ORIENTED FILMS OF BUTENE-1 HOMOPOLYMER AND COPOLYMERS

BACKGROUND OF THE INVENTION

1. Field of the Invention

The present invention relates to a method for preparing biaxially oriented films of butene-1 homopolymer and copolymers having high strength and improved optical properties.

2. Description of the Prior Art

Known in the prior art are processes to prepare films from butene-1 homopolymer and copolymers, and to biaxially orient such films to increase their strength and other physical characteristics. A known technique involves extruding a tubular sheet of film of such polymers through an annular die of suitable dimensions, inflating the extruded tube with air to stretch and orient it in the transverse direction, and then collapsing the inflated tube while simultaneously drawing it away from the extrusion die at a rate faster than that at which it is being extruded, thereby stretching and orienting it in the machine direction. Another technique involves the extrusion of the film in the form of a flat sheet through a die having a slit-like opening, and attaching the edges of the film to a tenter frame which stretches and orients it transversely while drawing the film away from the extruder at a rate faster than the rate of extrusion to stretch and orient it in the machine direction.

When the film is homopolymer of butene-1 or a copolymer of butene-1 with, for example, ethylene, it has been found that heretofore disclosed film-forming techniques do not produce a film of sufficient clarity to meet oftentimes stringent requirements in areas such as meat tray overwraps and other food wrapping applications. The root of the problem lies in the fact that poly(butene-1) has two crystalline states: Form I, a stable rhombohedral structure; and Form II, a transitory tetragonal structure. On crystallizing from the melt during gradual cooling to room temperature, the amorphous extrudate assumes the Form II structure, and upon prolonged standing practically all of the Form II crystals are transformed to Form I. Attempts to introduce orientation into poly(butene-1) resin by stretching films which already have a stable Form I crystal morphology along with a relatively high crystalline content have yielded films possessing oftentimes less than desired tensile or optical properties, or both. Other efforts to process poly(butene-1) films containing large crystal aggregates of the Form II structure into oriented films were unsuccessful because high stretch elongations could not be attained.

U.S. Pat. No. 3,468,862 describes a process for biaxial orientation of poly(butene-1) films wherein the amorphous extrudate is quickly quenched to below room temperature to solidify it while inhibiting the formation of Form II crystals. The amorphous film is then heated to 25°–110° C. and stretched while the film is substantially free of Form I crystal structure. The resultant oriented film has improved clarity over films of the prior art. However, the amount of haze remaining in such improved oriented film continues to be above the level desirable for consumer-oriented applications.

SUMMARY OF THE INVENTION

The present invention provides a process for the biaxial orientation of films of butene-1 homopolymer and copolymers having improved clarity and break strength as well as a desired high degree of permeability to oxygen. The process comprises extruding a film of butene-1 homopolymer or copolymer, quickly quenching the film while in the amorphous state, preferably at temperatures below 0° C. and more preferably below −20° C., and then stretching and orienting the film while maintaining it at a temperature sufficiently low to inhibit crystal formation. Subsequent heat setting above the stretching temperature and below the melting point of the polymer produces heat stable films of improved clarity and high break strength.

DESCRIPTION OF THE PREFERRED EMBODIMENTS

It is the purpose of the present invention to provide a process for the production of films of butene-1 homopolymer and copolymers of high strength and clarity, such copolymers being copolymers of butene-1 monomer and other olefinic monomers, preferably ethylene or propylene, and which copolymer contains a major amount (by mole ratio) of the butene-1 derived component. Copolymers of butene-1 and ethylene (e.g., up to 10 mole percent ethylene) and of butene-1 and propylene (e.g. up to 10 mole percent propylene) are embodiments for practice of the present invention. Such homopolymers and copolymers are prepared by well-known conventional methods and are extruded in either flat or tubular sheet form by conventional means.

Immediately upon extrusion and while the butene-1 homopolymer or copolymer is in its uncrystallized amorphous state, the film is quenched or cooled by rapidly removing the heat therefrom and reducing its temperature, preferably to below 0° C., and more preferably below −20° C. The quenching operation may be carried out by any of several known methods, to wit: passing the extrudate through a bath of chilled liquid; spraying a gas or liquid at low temperature over the surface of the films; passing the extrudate into a refrigerated chamber wherein the subsequent process steps may be carried out; and so forth. The precise methodology used to remove the heat from the film is not critical and will normally be determined by taking into consideration such factors as the design of the existing extrusion equipment, the physical structure of the film itself (whether flat or tubular and its overall dimensions), the amount of heat to be removed, and the inherent characteristics of the quenching fluid of choice.

Suitable quenching fluids include, but are not limited to: ice water; liquid nitrogen; isopropyl alcohol-dry ice mixture; ethylene glycol; and chilled air. Numerous other suitable fluids exist and will be apparent to one skilled in the art of film-forming.

The length of time the sheet can stay in its amorphous state before it crystallizes depends upon its temperature. At temperatures below −40° C. sheets can be kept indefinitely without crystallizing, while at 0° C. or above Form II crystallization commences within a few seconds. Quenching in the amorphous state is possible with poly(butene-1) because of its slow crystallization rate. It is this particular property, unique for a polyolefin, which makes it possible to stretch a flat sheet or tube in its amorphous state to form a high strength, high clarity film.

While maintaining the extruded sheet or tube at reduced temperature, e.g. below 0° C. and preferably below −20° C., it is biaxially stretched and oriented using conventional means. In the case of a flat sheet of extrudate such means include attaching the running edges thereof to the clips of a tenter frame which stretches and orients the quenched film transversely while simultaneously drawing it away from the extrusion die and stretching and orienting it in the machine direction. In the case of a tubular extrudate, the quenched film is inflated with a chilled gas, such as air, which causes the tube to expand into a bubble, thereby orienting it transversely. The machine direction stretch and orientation is accomplished by collapsing the bubble over a suitable pair of nip rollers and drawing it away from the die at a rate greater than that at which it was extruded. The amount that the sheet can be stretched will depend upon the sheet temperature. For instance, sheets in the temperature range of $-10°$ C. to $0°$ C. can be stretched to a film about one tenth the thickness of the amorphous sheets.

Following the stretching process, the films are in their stable Form I crystalline state. Subsequent heat setting above the stretching temperature, and below the crystalline melting point, produces heat stable films. Suitable heat setting temperatures are contemplated to be in the range of $60°$ C. to $125°$ C., with the composition of the film (homopolymer or copolymer) being determinative of the temperatures of choice and the amount of time required for such heat setting depending on the temperature and physical characteristics of the film.

EXAMPLE

Film samples were prepaered by melt-pressing $15.2$ cm $\times 15.2$ cm $\times 0.25$ mm (6 in. $\times$ 6 in. $\times$ 10 mil) plaques followed immediately by quenching in liquid nitrogen or isopropyl alcohol-dry ice. After the sample was quenched, it was mounted in a circular frame within a refrigerated chamber at $-10°$ C. and stretched to form a sphere 25.4 cm (10") in diameter by 0.025 mm (1 mil) thick by applying air pressure. The resultant sphere was then draped over a stainless steel cylinder and heat set with $80°$ C. water.

In order to determine the effectiveness of the quench operation, a small angle laser light scattering technique was used. A description of this technique is given by R. Stein and B. Rhodes in the Journal of Applied Physics, 31, 1873 (1960). By this technique it was possible to determine whether any detectable crystallinity existed in the quenched plaques and the time required for crystallinity to develop. It was found that plaques up to 125 mils thick could be quenched in the amorphous state at temperatures in the range of $-196°$ C. to $0°$ C. and that 6 minutes to 30 seconds were required to develop traces of crystallinity. Such time lag required for crystalinity to begin was found to be sufficient to make a continuous stretching process feasible.

The data in Table I compares the physical properties, oxygen transmission rates, and clarity for poly(butene-1) film (homopolymer) prepared via three distinctly different techniques:

(1) Cold stretched in the amorphous state (present invention);
(2) Cold stretched in the Form II crystalline state (as per U.S. Pat. No. 3,468,862);
(3) Hot stretched in the molten amorphous state.

TABLE I

Comparison of Properties of Poly (Butene-1) Biaxially Oriented Films Prepared at Different Conditions

| Fabrication Conditions | Tensile[1] Modulus psi | Yield[2] Stress psi | Break[3] Strength psi | Break[4] Elongation % | Oxygen Transmission[5] cc.mil/100in$^2$/24hr/atm | Haze[6] % |
|---|---|---|---|---|---|---|
| Cold Stretched in Amorphous state | 18,000 to 19,000 | 2370 | 9,800 to 10,400 | 87 | 314 to 460 | 2.3 to 2.6 |
| Cold Stretched in Form II Crystalline State | 24,000 | — | 12,000 to 13,000 | 90 to 110 | — | 7.5 |
| Hot Stretched in Molten Amorphous State (Blown Film) | 34,000 to 47,000 | 2300 to 3000 | 3,000 to 7,000 | 180 to 360 | 600 to 800 | 30 to 40 |

Test Method:
[1]ASTM - D-882
[2]ASTM - D-882
[3]ASTM - D-882
[4]ASTM - D-882
[5]ASTM - D-1434
[6]ASTM - D-1003

This data shows the improvement in break strength and opticals for the film produced by cold stretching in the amorphous state, as embodied herein, as compared to the film produced by the conventional or hot stretch process. For example, break strength is approximately doubled and haze is reduced from 30% to 2.3% by the practice of this invention. The break strength for film produced by cold stretching in the Form II crystalline state is about equivalent to that of the film produced by the present invention, but the haze is considerably higher (i.e. 7.5% vs. 2.3%) when the film is stretched in its Form II state.

Table II sets out comparative data for samples of butene-1 homopolymers and copolymers which illustrates the properties of films having various compositional characteristics. These characteristics are as follows:

Sample A: Homopolymer; 1.8 $(MI)_E$ (ASTM: D-1238)
Sample B: Homopolymer; 0.4 $(MI)_E$ (ASTM: D-1238)
Sample C: Copolymer; 9 mole % ethylene; 1.8 $(MI)_E$ (ASTM: D-1238)
Sample D: Copolymer; 1 mole % ethylene; 1.8 $(MI)_E$ (ASTM: D-1238)

TABLE II

Properties of Biaxially Oriented Butene-1 Homopolymer and Copolymer Stretched in their Amorphous State

| Sample Designation | Resin Type | Tensile[1] Modulus psi | Yield[2] Stress psi | Break[3] Strength psi | Break[4] Elongation % | Oxygen Transmission[5] cc.mil/100in²/24hr/atm | Haze[6] % |
|---|---|---|---|---|---|---|---|
| A | Homopolymer | 18,000 to 19,000 | 2370 | 9,800 to 10,400 | 87 | 314 to 460 | 2.3 to 2.6 |
| B | Homopolymer | 26,200 | 2370 | 10,600 | 122 | 518 | 3.7 |
| C | Copolymer | 11,000 to 12,500 | 1100 to 1200 | 7,870 to 8,370 | 90 to 185 | 558 | 5.2 to 6.2 |
| D | Copolymer | 20,400 to 25,000 | 1700 to 1900 | 5,800 to 6,000 | 70 to 160 | 460 to 500 | 2.7 to 2.8 |

[1]-[6] see Table I

Although described with reference to preferred embodiments, it is to be understood that modifications and variations to the herein disclosed invention may be resorted to without departing from the spirit thereof, as those skilled in the art will readily understand. Such variations and modifications are considered to be within the purview and scope of the appended claims.

I claim:

1. A process for preparing biaxially oriented poly(butene-1) sheet material having improved optical properties, said process comprising:
   (a) extruding a film of molten poly(butene-1) resin;
   (b) contacting the extruded film material, prior to the formation of substantially any crystalline structure therein, with a low temperature fluid material to rapidly reduce the temperature of said film to below 0° C. and thereby solidify said film in the amorphous state; and
   (c) biaxially stretching said cold amorphous film while maintaining the temperature thereof at below 0° C. to inhibit the formation of crystals therein.

2. The process of claim 1 wherein said biaxially oriented sheet material having improved optical properties is prepared from butene-1 monomer copolymerized with up to ten mole percent of another monomer, said other monomer being selected from the group consisting of ethylene and propylene.

3. The process of claims 1 or 2 wherein the extruded film is solidified and biaxially stretched at below minus 20° C. while the polymer is still in the substantially amorphous state.

4. The process of claims 1 or 2 wherein the extruded film is solidified at below minus 20° C. and biaxially stretched at below 0° C. while the polymer is still in the substantially amorphous state.

5. The process of claims 1 or 2 further comprising the additional step of elevating the temperature of the biaxially stretched film to between 60° C. and 125° C. for a sufficient time to heat set said film.

* * * * *

UNITED STATES PATENT AND TRADEMARK OFFICE
CERTIFICATE OF CORRECTION

PATENT NO. : 4,385,022
DATED : May 24, 1983
INVENTOR(S) : CHARLES L. ROHN

It is certified that error appears in the above—identified patent and that said Letters Patent is hereby corrected as shown below:

On the title page insert the following after item [22]

-- Related U.S. Application Data
  Continuation of Serial No. 118,277 filed February 1, 1980; which is a continuation Serial No. 910,396, filed May 30, 1978, abandoned; which is a continuation of Serial No. 770,121, filed February 18, 1977, abandoned.--

Insert the following after the title at column 1 of the specification:

-- CROSS REFERENCE TO RELATED APPLICATIONS

This is a continuation of Serial No. 118,277 filed February 1, 1980; which is a continuation of Serial No. 910,396, filed May 30, 1978, abandoned; which is a continuation of Serial No. 770,121, filed February 18, 1977, abandoned. Serial No. 429,659 filed September 30, 1982 is a divisional of this application.--

Signed and Sealed this

Third Day of September 1985

[SEAL]

Attest:

DONALD J. QUIGG

Attesting Officer  Acting Commissioner of Patents and Trademarks - Designate